United States Patent
Dubey

(10) Patent No.: US 10,632,908 B2
(45) Date of Patent: Apr. 28, 2020

(54) METHOD AND APPARATUS FOR VEHICULAR COMMUNICATION

(71) Applicant: Ria Dubey, Troy, MI (US)

(72) Inventor: Ria Dubey, Troy, MI (US)

( * ) Notice: Subject to any disclaimer, the term of this patent is extended or adjusted under 35 U.S.C. 154(b) by 0 days.

(21) Appl. No.: 16/135,853

(22) Filed: Sep. 19, 2018

(65) Prior Publication Data
US 2020/0086784 A1    Mar. 19, 2020

(51) Int. Cl.
*B60Q 5/00*    (2006.01)
*H04W 4/46*    (2018.01)

(52) U.S. Cl.
CPC .............. *B60Q 5/003* (2013.01); *H04W 4/46* (2018.02)

(58) Field of Classification Search
CPC ........... H04M 1/7253; H04M 2250/02; H04W 76/10; H04W 84/18; H04W 88/06; H04W 4/46; B60Q 5/003
See application file for complete search history.

(56) References Cited

U.S. PATENT DOCUMENTS

| | | | | |
|---|---|---|---|---|
| 3,795,770 A * | 3/1974 | Kato | ............... | G10H 1/12 84/723 |
| 5,588,735 A * | 12/1996 | Harada | ............... | A45B 3/00 362/102 |
| 6,195,008 B1 * | 2/2001 | Bader | ............... | B60R 21/01516 180/271 |
| 7,515,065 B1 * | 4/2009 | Bygrave | ............... | G08G 1/0965 340/901 |
| 7,706,548 B2 * | 4/2010 | Kanevsky | ............... | H04B 11/00 381/77 |
| 7,844,247 B2 * | 11/2010 | Chen | ............... | G08G 1/205 455/404.1 |
| 8,223,930 B2 * | 7/2012 | Narang | ............... | H04M 3/537 379/70 |
| 8,577,344 B2 * | 11/2013 | Kobylarz | ............... | H04W 4/00 455/414.1 |
| 8,725,313 B2 * | 5/2014 | Purushothannan | ...... | B60Q 5/00 701/1 |
| 2004/0142678 A1 * | 7/2004 | Krasner | ............... | G08B 25/016 455/404.2 |
| 2004/0166828 A1 * | 8/2004 | Yosioka | ............... | G08B 25/016 455/344 |
| 2005/0185052 A1 * | 8/2005 | Raisinghani | ........... | H04N 7/183 348/148 |
| 2007/0075848 A1 * | 4/2007 | Pitt | ............... | B60R 25/102 340/426.2 |

(Continued)

OTHER PUBLICATIONS http://www.talkingcar.com/, accessed Sep. 19, 2018.

*Primary Examiner* — Babar Sarwar
(74) *Attorney, Agent, or Firm* — The Dobrusin Law Firm, P.C.

(57) ABSTRACT

A mobile device comprising: (a) an antenna, and (b) a software application; wherein the mobile device is a transmitting mobile device, a receiving mobile device, or both; wherein the software application directs the transmitting mobile device to transmit a signal, comprising an audio file, to the receiving mobile device running the same software application: wherein the signal is converted to an audible signal, a message, or a combination thereof by the software application of the receiving mobile device; wherein the audible signal, converted by the receiving mobile device, is used in lieu of an audible signal produced by an OEM horn.

18 Claims, 8 Drawing Sheets

(56) References Cited

U.S. PATENT DOCUMENTS

| | | | |
|---|---|---|---|
| 2009/0033505 A1* | 2/2009 | Jones | G08B 25/009 340/584 |
| 2009/0083100 A1* | 3/2009 | Darby, Jr. | G06Q 10/0635 705/7.28 |
| 2010/0027766 A1* | 2/2010 | Shin | H04M 3/5315 379/85 |
| 2010/0054429 A1* | 3/2010 | Tonini | G10L 17/24 379/88.02 |
| 2010/0137006 A1* | 6/2010 | Rofougaran | H04M 1/6075 455/457 |
| 2010/0273446 A1* | 10/2010 | Stahlin | G01S 5/0036 455/404.2 |
| 2011/0060480 A1* | 3/2011 | Mottla | G06Q 10/02 701/2 |
| 2012/0195325 A1* | 8/2012 | Connelly | H04L 51/14 370/432 |
| 2013/0069802 A1* | 3/2013 | Foghel | G08G 1/205 340/989 |
| 2013/0136114 A1* | 5/2013 | Hietalahti | H04W 76/10 370/338 |
| 2013/0204458 A1* | 8/2013 | Purushothaman | B60Q 5/00 701/1 |
| 2014/0118128 A1* | 5/2014 | Orzeck | B62J 3/00 340/432 |
| 2015/0002313 A1* | 1/2015 | Caskey | G08G 1/0965 340/902 |
| 2015/0031324 A1* | 1/2015 | Zentner | H04W 4/90 455/404.2 |
| 2015/0232024 A1* | 8/2015 | McKown | B60Q 5/00 340/425.5 |
| 2015/0310740 A1* | 10/2015 | Elzein | G08G 1/0965 340/902 |
| 2015/0365979 A1* | 12/2015 | Park | H04L 67/12 455/404.2 |
| 2016/0292997 A1* | 10/2016 | Milne | G08G 1/005 |
| 2016/0357188 A1* | 12/2016 | Ansari | G05D 1/0212 |
| 2017/0018182 A1* | 1/2017 | Makled | G08B 21/02 |
| 2017/0039848 A1* | 2/2017 | Hakeem | G08G 1/052 |
| 2017/0171690 A1* | 6/2017 | Kim | H04L 67/125 |
| 2018/0077668 A1* | 3/2018 | Chun | H04W 48/16 |
| 2018/0197352 A1* | 7/2018 | Ganesh | H04W 4/46 |
| 2018/0218753 A1* | 8/2018 | Hodge | G06Q 40/08 |
| 2018/0262887 A1* | 9/2018 | Futaki | H04W 48/20 |
| 2018/0310159 A1* | 10/2018 | Katz | H04M 3/5116 |
| 2019/0059091 A1* | 2/2019 | Tang | H04W 74/0808 |
| 2019/0066464 A1* | 2/2019 | Wedig | G08B 7/066 |
| 2019/0253853 A1* | 8/2019 | Makled | H04W 4/46 |

* cited by examiner

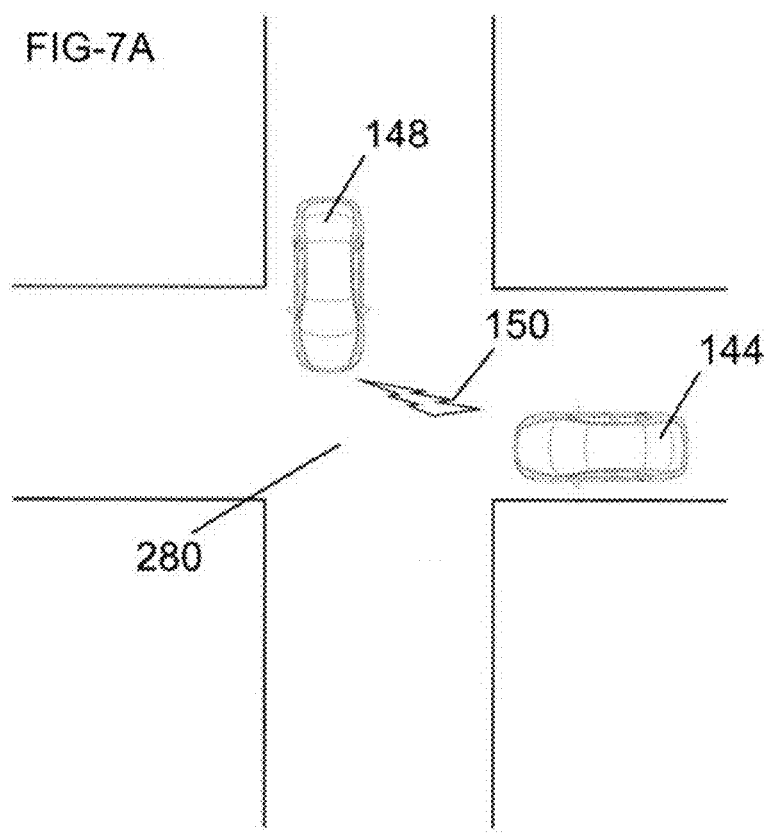

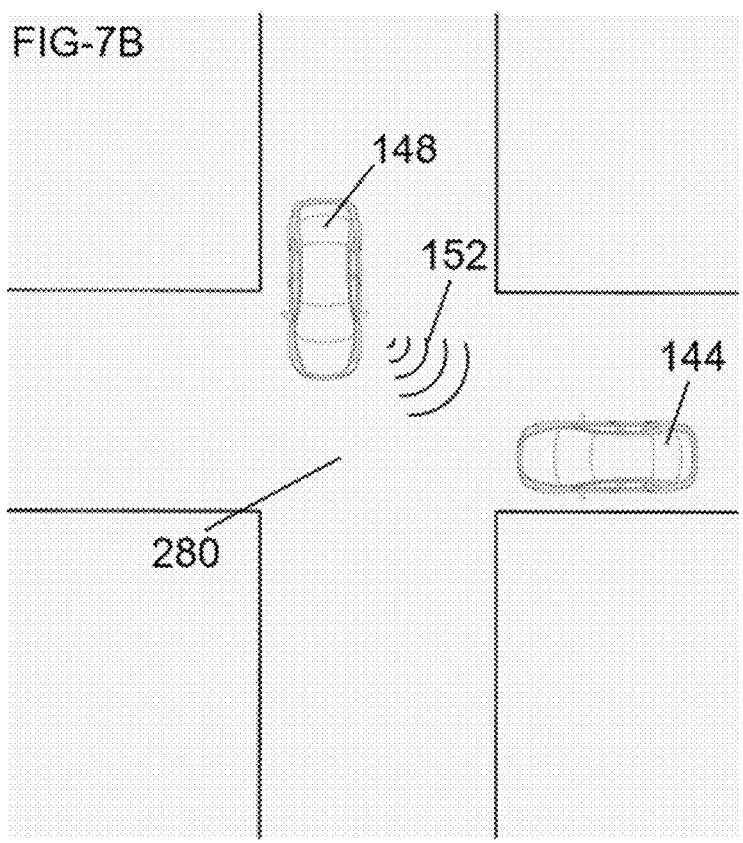

METHOD AND APPARATUS FOR VEHICULAR COMMUNICATION

FIELD

The present teachings relate to a device that permits one user to communicate to another user and particularly allows two users that are not privy one another to communicate with each other via visual cues, verbal cues, or an app.

BACKGROUND

Currently, while driving in a vehicle, occupants of two adjacent cars communicate via honking a horn or hand signals such as waiving. More recently some companies have developed cellular telephone applications that permit a driver in one vehicle to provide passive feedback to a driver in another vehicle. For example, if a driver of a first vehicle is driving by a car accident, the driver can mark the location of the accident so that as a second driver is approaching the accident the second driver is alerted to the accident. Attempts have been made to increase forms of communication between vehicles or between a vehicle and an adjacent person by permitting different sounds or talking to be emitted from the vehicle. Some examples of communication may be found in U.S. Pat. No. 8,725,313; U.S. Patent Application No. 2015/023202; and http://www.talkingcar.com, all of which are expressly incorporated by reference herein for all purposes.

What is needed is a device that permits a vehicle occupant to provide feedback to an adjacent person. It would be desirable to have a speaker that is programmable to emit signals to an adjacent vehicle or person. What is needed is a device that can anonymously provide messages from one cellular phone to an adjacent cellular phone. It would be desirable if one cell phone user can communicate with an adjacent cell phone user without either cell phone user being privy to the other cell phone user's phone number. What is needed is a communication system that is linked to and communicated messages from a cell phone to a person within a proximity.

SUMMARY

The present teachings provide a mobile device comprising: (a) an antenna, and (b)a software application; wherein the mobile device is a transmitting mobile device, a receiving mobile device, or both; wherein the software application directs the transmitting mobile device to transmit a signal, comprising an audio file, to the receiving mobile device running the same software application; wherein the signal is converted to an audible signal, a message, or a combination thereof by the software application of the receiving mobile device; wherein the audible signal, converted by the receiving mobile device, is used in lieu of an audible signal produced by an OEM horn.

The present teachings provide a method comprising the steps of: (a) selecting an audio file, (b) selecting a target vehicle, (c) confirming a selection; and (d) transmitting the audio file to a receiving mobile device after the selection is confirmed; wherein the method is performed on a transmitting mobile device.

The present teachings provide a device that permits a vehicle occupant to provide feedback to an adjacent person. The present teachings provide a speaker that is programmable to emit signals to an adjacent vehicle or person. The present teachings provide a device that can anonymously provide messages from one cellular phone to an adjacent cellular phone. The present teachings provide one cell phone user can communicate with an adjacent cell phone user without either cell phone user being privy to the other cell phone user's phone number. The present teachings provide a communication system that is linked to and communicated messages from a cell phone to a person within a proximity.

BRIEF DESCRIPTION OF THE DRAWINGS

FIG. 7A illustrates an aerial perspective view of vehicles at an intersection.
FIG. 7B illustrates an aerial perspective view of vehicles at an intersection.

DESCRIPTION

Figure 1:
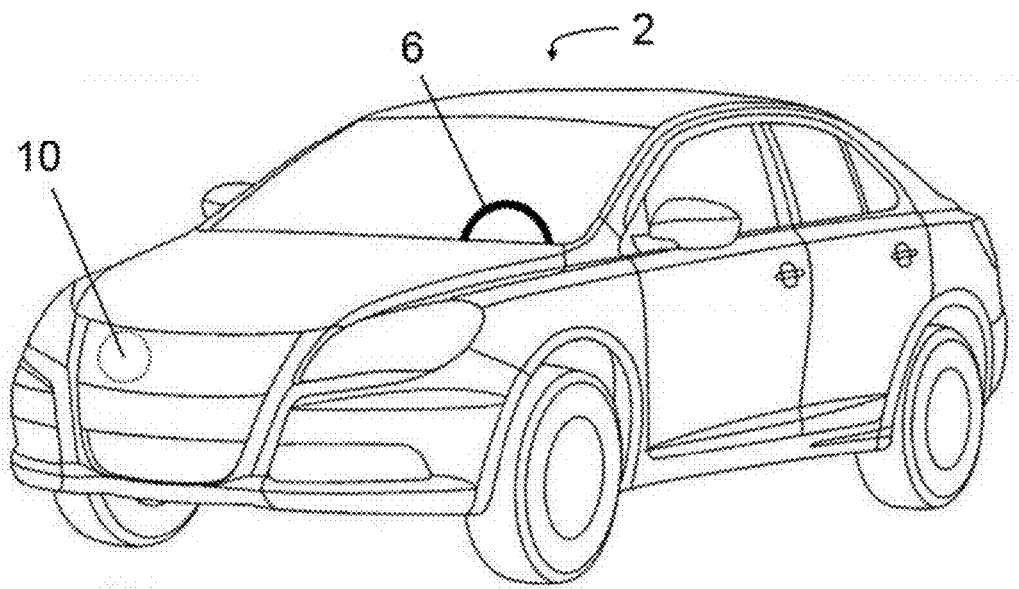
FIG. 1 illustrates a perspective view of a vehicle.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The vehicle may function to transport a passenger. The vehicle may include any vehicle conventionally driven on a road. The vehicle may include a car, a motorcycle, a bus, a truck, or the like. The vehicle may have features such as color, make, model, year of manufacture, license plate number, or a combination thereof. The vehicle may have a VIN number, which may indicate color, make, model, and year of manufacture. The vehicle may include an engine bay a radiator, a grille, an OEM horn, or a combination thereof. Furthermore, the vehicle may include a passenger, a steering wheel, a selector-integrated steering wheel, an OEM horn, a speaker, or a combination thereof. The vehicle may be a target vehicle or a transmit vehicle, if the passenger receives a signal via a mobile device, the vehicle is a target vehicle. If the passenger sends a signal via a mobile device, the vehicle is a transmit vehicle The passenger may control the vehicle and control the operation of the mobile device. The passenger may control the function of the vehicle through a steering wheel or a selector-integrated steering wheel. The passenger may control the operation of the mobile device by directly interacting with the mobile device or via a selector device or selector-integrated steering wheel. The passenger may send a signal or receive a signal.

The steering wheel may function to control the vehicle and receive a selector device. The steering wheel may be an OEM-installed component. The steering wheel may include a handle portion, a spoke portion, a central portion, or a combination thereof. The handle portion may be the distal component of the steering wheel, offset a distance from the central portion. The spoke portion may connect the handle portion to the central portion. The central portion may be connected to the steering column of the vehicle. The central portion may include an airbag, an airbag deployment mechanism, and an airbag cover. The airbag cover may include edges, which define a seam that separates the airbag cover from the central portion. The edges may be configured such that an attaching member can grip to the edges. For example, a hook (i.e., a piece of material bent around itself) may wrap around the edges and secure an object, attached to the hook, to the airbag cover.

The airbag cover may function to cover the interior componentry of the steering wheel. The airbag cover may be an OEM component. Alternatively, the airbag cover may be an aftermarket component. For example, the owner of the vehicle may decide to remove an OEM airbag cover and replace it with an aftermarket airbag cover having a selector device integrated in the airbag cover. In such a case that the airbag cover is an aftermarket airbag cover having a selector device integrated in the airbag cover, the steering wheel may be a selector-integrated steering wheel.

The selector-integrated steering wheel may function to control the vehicle and control a mobile device. The selector-integrated steering wheel may be an aftermarket part. The steering wheel may include a handle portion, a spoke portion, a central portion, or a combination thereof. The central portion may include an airbag, an airbag deployment mechanism, and an airbag cover. The airbag cover may include edges, which define a seam that separates the airbag cover from the central portion. The selector-integrated steering wheel may include a selector device. The selector device may be integrated into the handle portion, a spoke portion, or a central portion of the steering wheel. For example, the selector device may include a plurality of buttons that are distributed along the handle portion, the spoke portion, the central portion, or a combination thereof. Alternatively, the selector device may be integrated into the structure of the airbag cover.

The OEM horn may function to generate a sound to communicate to nearby vehicles. The OEM horn may generate an audible "honk". The OEM horn may be located in the front portion of the engine bay of the vehicle. More particularly, the OEM horn may be located forward of the radiator and behind the grille of the vehicle. The OEM horn may be held in place by a fixed attachment to the frame of the vehicle or to adjacent vehicle components.

The speaker may function to communicate with the mobile device and generate sound to communicate with nearby vehicles. The sound generated by the speaker may be of a larger variety than that of the OEM horn. For example, the speaker may generate an expressive sound or an emotional sound. The speaker may include attaching members. The speaker may be installed on or adjacent to the OEM horn or on any portion of the vehicle. Particularly, the speaker may include wire ties that wrap around the OEM horn or adjacent components. Preferably, the speaker is installed over the OEM horn. The speaker may have a wired or wireless connection to the mobile device. For example, the speaker may include a Bluetooth module that may receive Bluetooth signals from a mobile device. Alternatively, the speaker may be directly wired to the mobile device. More specifically, the mobile device may be wired to an auxiliary audio connection or a USB connection in the vehicle and the OEM electronics of the vehicle, receiving the auxiliary audio connection or USB connection, may be wired to the speaker.

The attaching member may function to affix an object to a structure. The object being affixed may include a speaker, a selector device, or a combination thereof. The attaching member may attach to any structure of the vehicle. The structure the object is affixed to may include a vehicle component such as an OEM horn or a steering wheel. The attaching member may include hooks, wire ties, clamps, clips, VELCRO®, etc.

The selector device may function to control a mobile phone without having to manually access and manipulate the mobile phone. The selector device may include a plurality of buttons, a unique code, an attaching member, or a combination thereof. The selector device may include an attaching member. Via the attaching member, the selector device may be placed on any structure of the vehicle that is most comfortable for the passenger. For example, if the attaching member comprises clips, the passenger may affix the selector device by pushing the clip onto a louver of an A/C vent. Alternatively, if the attaching member comprises VELCRO®, the passenger may decide to affix the selector device by sticking the VELCRO® on a central portion of the vehicle's dashboard.

The plurality of buttons may function to send an assigned sound when activated. The plurality of buttons may include a first button, a second button, a third button, a fourth button, a fifth button, a sixth button, a send button or a combination thereof. The plurality of buttons may include more than seven buttons. The plurality of buttons may be programmed to correspond to a certain sound. For example, if a first button is programmed to a particular sound, activating the button may direct the mobile phone to transmit that particular sound—such an arrangement circumvents the need to manipulate a mobile phone while driving. The plurality of buttons may be programmed via a software application run by a mobile device. More particularly, the plurality of buttons may be programmed by activating a software application, choosing a sound from a library of sounds displayed in the software application, choosing one of a plurality of buttons where it is desired the sound be assigned, and confirming the assignment choice. The plurality of buttons may be reprogrammable. The plurality of buttons may be mechanical buttons, or electronic buttons such as a capacitive sensor pads or a touchscreen layered with a digital display. The plurality of buttons may be labelled. For example, the labels may include numeric designations, pictorial designations, braille, boss, words, or a combination thereof.

The unique code may function to correspond to a particular selector device and provide a reference for connecting a selector device to a mobile device. The unique code may be any code that comprises any number of digits, letters, special characters, or a combination thereof. The unique code may be displayed on the selector device or stored within the selector device. For example, where the selector device is made at least partially of a polymer, the unique code is molded into the polymer. Alternatively, where the selector device includes a digital display, the unique code appears in the digital display. The unique code may be displayed on the front of the device, the back of the device, or on the sides of the device. When a mobile device is in communication with the selector device, the mobile device may display the unique code associated with the selector device and thereafter ask if the passenger would like to pair the mobile phone with the selector device associated with the unique code as shown. The mobile phone may receive a signal from more than one selector device located within its proximity and may give the passenger a choice of which selector device to pair to. Alternatively, the mobile phone may prompt the passenger to input a unique code associated with the selector device that is desired to be paired.

The mobile device may function to communicate with the selector device, a speaker, a receiving mobile device, or a combination thereof. The mobile device may be a mobile phone of any variety or brand such as an Apple iPhone or Samsung Galaxy. Particularly, the mobile device is a smartphone capable of running software applications. The mobile device may transmit a wireless signal, in which case it is a transmitting mobile device. The mobile device may receive a wireless signal, in which case it is a receiving mobile device. The mobile device may include a user interface, a software application, an antenna, a microphone, a processor, or a combination thereof.

The antenna may function to communicate signals between separate devices. The antenna may be a transmitter, a receiver, or both. If the antenna is both a transmitter and receiver, the mobile device includes an antenna switch, which directs the antenna to switch between a transmitter function or a receiver function. The antenna may communicate with wireless signals. Specifically, the antenna may communicate with cellular signals, Wi-Fi signals, or Bluetooth signals. A transmitter may function to send a signal to another mobile device, a selector device, or a combination thereof. A receiver may function to receive a signal from another mobile device, a selector device, or a combination thereof.

The microphone may function to receive an audible signal conveyed by the voice of a passenger. The microphone may be located on any portion of the exterior of the phone. Preferably, the microphone is located along a bottom edge of the phone. The microphone may transmit the information in the audible signal to a processor running the software application. The microphone may be utilized to dictate commands to the software application so the passenger may operate the software application without manually manipulating the phone.

The processor may function to control and execute operations. Specifically, the operation may include the operation of a software application according to the teachings of the present application.

The signal may function to transport information. The signal may be an audible signal, a wired signal, a wireless signal, a text message signal, or a combination thereof. The signal may transport information between a selector device and a mobile phone, between a mobile phone and another mobile phone, between a mobile phone and a speaker, or a combination thereof. If the signal is an audible signal, it may be transported from a speaker to a target vehicle. If the signal is a wireless signal, it may be transported from a selector device to a mobile device or vice versa. Alternatively, if the signal is a wireless signal, it may be transported from one mobile phone to another. Alternatively, if the signal is a wireless signal, it may be transported from a mobile phone to a speaker. If the signal is a wired signal, the signal may be transported from a mobile phone to a speaker.

The expressional sound may function to convey information in the form of a verbal expression. The expressional sound may be utilized in lieu of an OEM horn in order to enable a broader scope of communication. The expressional sound may include sounds such as "thank you", "you're welcome", "try better next time", "please", or "go ahead". For example, if one vehicle allows another vehicle to pass, a passenger in the passing vehicle might communicate the phrase "thank you" to the vehicle that allowed the passing vehicle to pass. The expressional sound may be purchased, pre-programmed, or recorded by a passenger.

The emotional sound may function to convey information in the form of an emotion. The emotional sound may include a sigh, groan, or hum. The expressional sound may be utilized in lieu of an OEM horn in order to enable a broader scope of communication. For example, if a vehicle blocks another vehicle from merging into the vehicle's lane, the blocked vehicle may communicate a groan to the blocking vehicle. Alternatively, if two vehicles are at an intersection of a four-way stop and a vehicle fails to wait their turn to pass through the intersection, the passenger of the vehicle who was cut off at the intersection may convey a sigh to the vehicle that passed through the intersection out of order. The emotional sound may be purchased, pre-programmed, or recorded by a passenger.

The message may function to convey information in the form of readable text. The message may be dictated to the mobile device through a speaker function or the message may be manually typed into the mobile device via a keyboard. The message may also comprise pre-programmed phrases that prevent a passenger from the need to manipulate their phone while driving. The message may appear on the mobile device. The message may include characters, numbers, emojis, or a combination thereof.

The user interface may function to display content and receive inputs from a passenger. The user interface may take inputs from the passenger and communicate the inputs to a software application. The user interface may include interactive segments, decorative segments, information segments, or a combination thereof. The interactive segments, decorative segments, and information segments may be overlaid upon each other. The interactive segments may be buttons that communicate with the software application, direct the action of the software application, or a combination thereof. The decorative segments may be graphical design making the user interface aesthetically pleasing, easier to understand, visually exciting, or a combination thereof for the passenger. The information segments may display information such as directions for the passenger to follow, a menu of options, alerts, messages, or a combination thereof. The user interface may include menus such as a main menu, a purchase/assign menu, an assign menu, a transmit menu, a medium menu, or a combination thereof. The menus may function to organize the flow of a software application's functioning in order to facilitate an ease of use.

The software application may function to receive inputs and produce outputs based upon the inputs. The software application may run on a computer, specifically a mobile device. The software application may be available on a mobile device's app store such as the Google Play Store or Apple App Store. The software application may present a passenger with functions, receive inputs from a passenger, and direct functions associated with a passenger's inputs.

The software application as discussed herein is interacted with using a process. The process may include one or more of the following steps produced in virtually any order.

The main menu may function to give a passenger a choice between purchase/assign functionality (e.g., in the purchase/assign menu) or sharing functionality (e.g., in the sharing menu). A passenger may perform a step of accessing the main menu by activating a software application on their mobile device. A passenger may access the purchase/assign functionality or sharing functionality by activating the requisite button on the main menu.

The purchase/assign menu may function to give a passenger a choice between a purchase functionality (e.g., in the purchase/assign menu) or an assigning functionality (e.g., in the assign menu). A passenger may perform a step of accessing a purchase menu. The purchase menu may include an audio file catalog, an audio file, a confirmation button, or a combination thereof. Through the purchase menu, a passenger may choose an audio file from an audio file catalogue. An audio file may encode a sound including an expressional sound or an emotional sound. After selecting an audio file, the passenger may confirm a purchase. A passenger may perform a step of accessing an assign menu. The assign menu may include an audio file library, an audio file, an assignment map, docks, a confirmation button, or a combination thereof. The docks may be buttons corresponding individually to one of a plurality of buttons on the selector device. The audio file library may be navigated and an audio file may be chosen. An assignment map may show an approximate schematic of a selector device, including a plurality of buttons. A passenger may select a location on the assignment map, corresponding to one of a plurality of buttons on the selector device, to which an audio file will be assigned. A passenger may then activate a confirmation button, which finalizes the assignment of an audio file to a location on the assignment map.

A passenger may perform a step of accessing a transmit menu, which functions to facilitate selecting an audio file, selecting a target of the audio file, selecting a medium of transmission or a combination thereof. The target may refer to a vehicle, a mobile device located within a vehicle, or a passenger, which the sound is directed to. The medium of transmission may refer to a wireless medium (e.g., sending a sound to a mobile device in a target vehicle via Bluetooth) or an audible medium (e.g., broadcasting a sound from a speaker). The transmit menu may include an audio file library, which contains audio files. The passenger may navigate the audio file library and select an audio file the passenger desires to transmit to a target vehicle. The transmit menu may include a target menu, which further includes a target icon, and a medium menu, which further includes medium icons. The passenger may perform a step of navigating the target menu and a step of choosing a target icon, which may correspond to the vehicle the passenger wishes to send a sound to. For example, the target icon may be displayed as the color, make, and model of a target vehicle, which is shown based upon the software application registration information of the target vehicle. The passenger may perform a step of navigating a medium menu to locate the desired medium with which the sound will be communicated. For example, the medium menu may include medium icons such as a Bluetooth icon or a speaker icon, such as those conventionally displayed on mobile devices. The passenger may perform a step of activating a confirmation button, which confirms a selection made in the user interface. The confirmation button may appear after a selection is made either in the transmit menu or the medium menu. Alternatively, the confirmation button may appear on the mobile device concurrent with both the transmit menu and the medium menu.

Alternative to accessing a transmit menu of the software application through a mobile device, a passenger may perform a step of selecting one of a plurality of buttons on the selector device. By selecting one of a plurality of buttons, a particular sound is selected. A passenger may perform a step of activating a send button, which confirms the selection and sends a sound to a target vehicle. The selector device may automatically send the sound to the closest adjacent vehicle. Alternatively, the selector device, when activated by a passenger by pressing one of a plurality of buttons, may prompt the mobile phone to display a target menu and the passenger may perform a step of navigating the target menu and a step of choosing a target icon, which may correspond to the vehicle the passenger wishes to send a sound to. The selector device may include a digital display, in which case the target menu may be shown directly on the selector device.

Alternative to both accessing a transmit menu or manipulating a selector device, the passenger may perform the steps of accessing a transmit menu, navigating an audio file library, selecting an audio file, accessing a target menu, selecting a target vehicle, accessing a medium menu, selecting a medium by voice. Particularly, the software application may be voice activated by utilizing the microphone of the mobile device. For example, a passenger may say, "Application, please tell the red Honda in front of me 'thank you'". Alternatively, a passenger may say, "Application, please send the red Honda in front of me a message, thumbs up emoji." Generally, the verbal command may include an activating word that initiates the software application, a descriptive phrase that indicates a target vehicle to the software application, a medium phrase indicating how the communication is to be sent, and a communicative phrase indicating the substance of the communication.

FIG. 1 illustrates a vehicle 2. The vehicle includes a steering wheel 6 within the cab and an OEM horn 10 located in the engine compartment, forward of the radiator.

Figure 2:
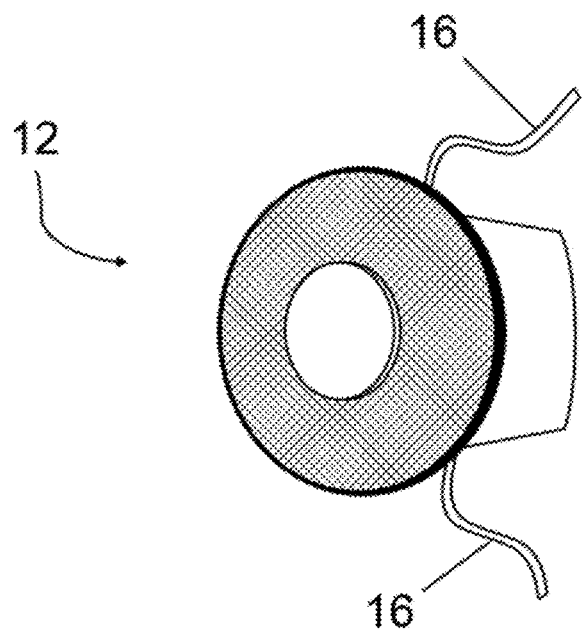
FIG. 2 illustrates a perspective view of a speaker.

FIG. 2 illustrates a speaker 12 according to the present disclosure. The speaker 12 includes two attaching members 16, which are wire ties.

Figure 3:
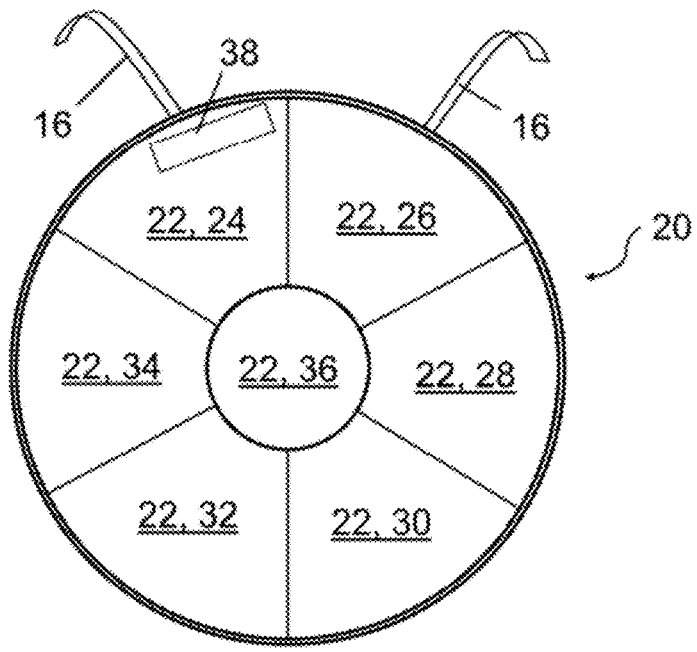
FIG. 3 illustrates a perspective view of a selector device.

FIG. 3 illustrates a selector device 20 according to the present disclosure. The selector device 20 includes two attaching members 16 and a plurality of buttons 22. The attaching members 16 extend from the selector device 20. The attaching members 16 are hangers that suspend the selector device 20 from an airbag cover (not shown). The plurality of buttons 22 includes a first button 24, a second button 26, a third button 28, a fourth button 30, a fifth button 32, a sixth button 34, and a send button 36. The plurality of buttons 22 are arranged in a circular arrangement around the send button 36 and the plurality of buttons 22 are arranged in ascending chronological order in a clockwise direction. The selector device 20 includes a unique code 38.

Figure 4A:
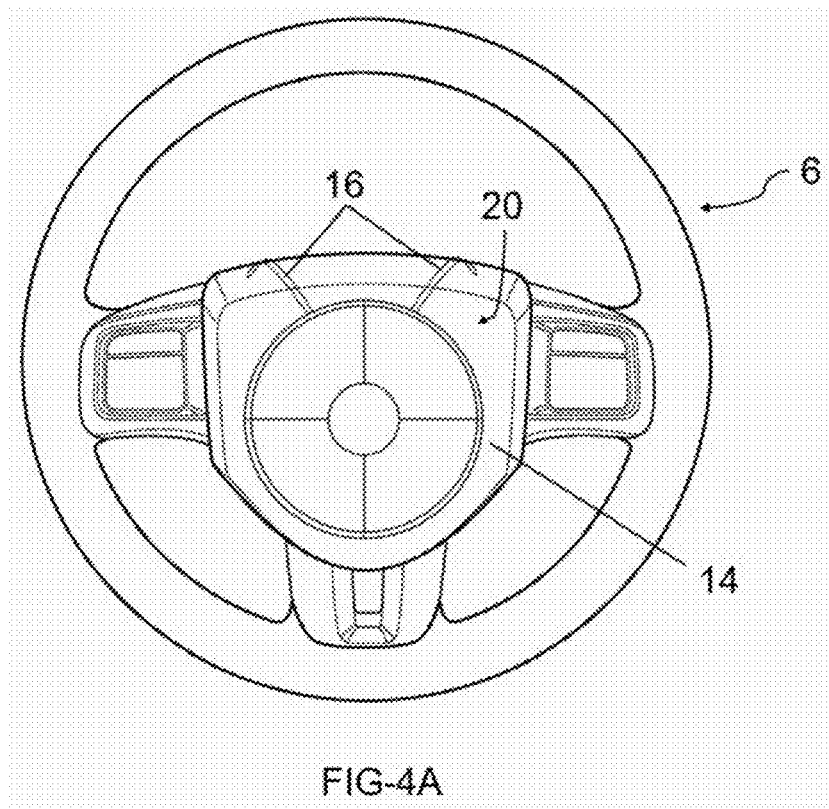
FIG. 4A illustrates a perspective view of a selector device installed on a steering wheel.

FIG. 4A illustrates a steering wheel 6 and a selector device 20 attached to the steering wheel 6. The steering wheel 6 includes an airbag cover 14. The selector device includes attaching members 16, which affix the selector device 20 to the steering wheel 6.

Figure 4B:
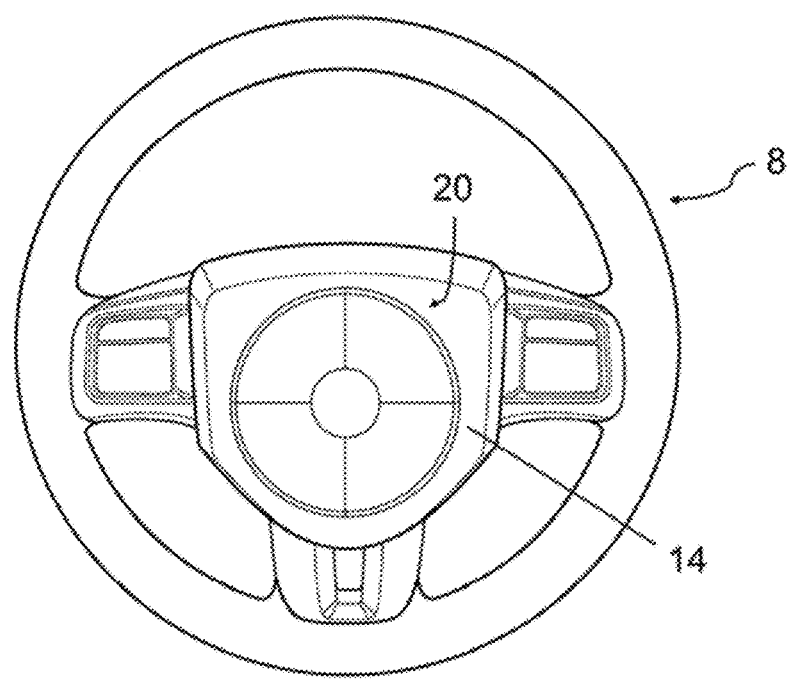
FIG. 4B illustrates a perspective view of a selector-integrated steering wheel.

FIG. 4B illustrates a selector-integrated steering wheel 8. The selector-integrated steering wheel 8 is characterized by a selector device 20 integrated in the selector-integrated steering wheel 8. Specifically, the selector device 20 is integrated in the airbag cover 14.

Figure 5A:
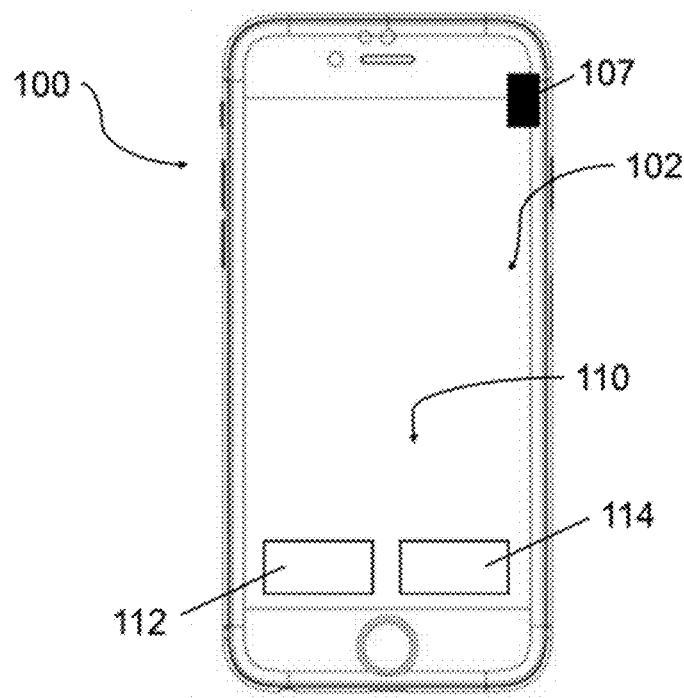
FIG. 5A illustrates a mobile device having a user interface displaying a main menu.

FIG. 5A illustrates a mobile device 100 having an antenna 107, and a user interface 102 displaying a main menu 110. The main menu 110 includes a purchase/assign menu button 112 and a transmit menu button 114.

Figure 5B:
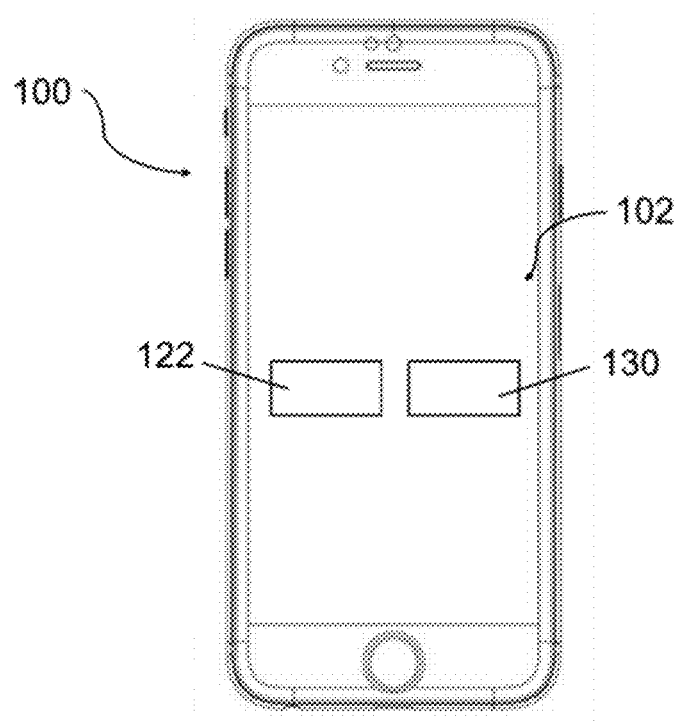
FIG. 5B illustrates a mobile device having a user interface displaying a purchase/assign menu.

FIG. 5B illustrates a mobile device 100 having a user interface 102 displaying a purchase/assign menu 120 including a purchase menu button 122 and an assign menu button 130.

Figure 5C:
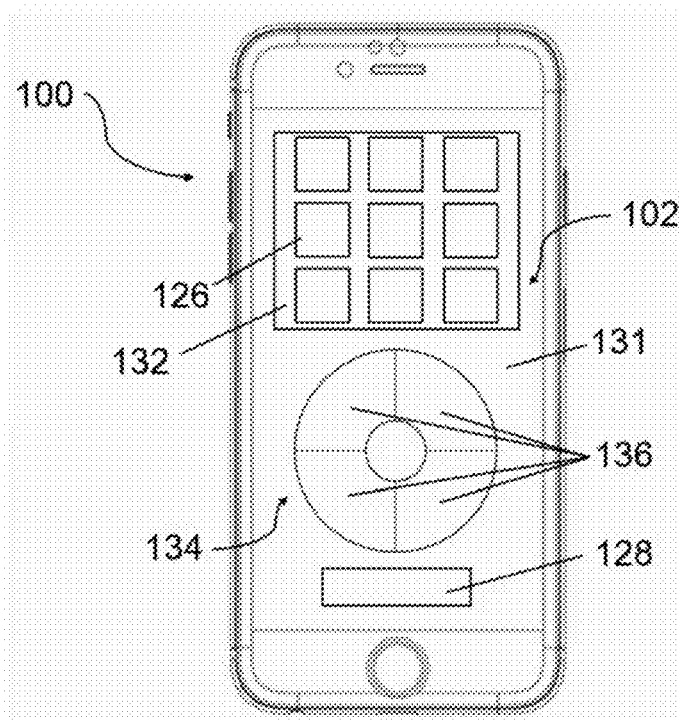
FIG. 5C illustrates a mobile device having a user interface displaying an assign menu.

FIG. 5C illustrates a mobile device 100 having a user interface 102 displaying an assign menu 131. The assign menu 131 shows an audio file library 132, having audio files 126, an assignment map 134, and a confirmation button 128. The assignment map 134 includes docks 136, which correspond to the plurality of buttons (not shown) located on the selector device (not shown). The audio file library 132, assignment map 134, and confirmation button 128 is arranged in a chronological order from the top of the mobile device 100 to the bottom of the mobile device 100.

Figure 5D:
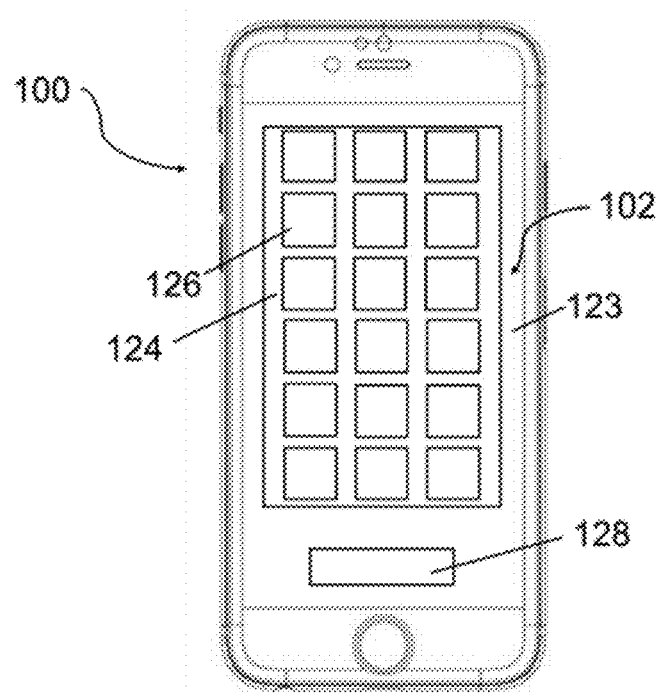
FIG. 5D illustrates a mobile device having a user interface displaying a purchase menu.
FIG. SE illustrates a mobile device having a user interface displaying a transmit menu.
FIG. SF illustrates a mobile device having a user interface displaying a message.

FIG. 5D illustrates a mobile device 100 having a user interface 102 displaying a purchase menu 123. The purchase menu 123 shows an audio file catalog 124, which includes audio files 126, and a confirmation button 128.

Figure 5E:
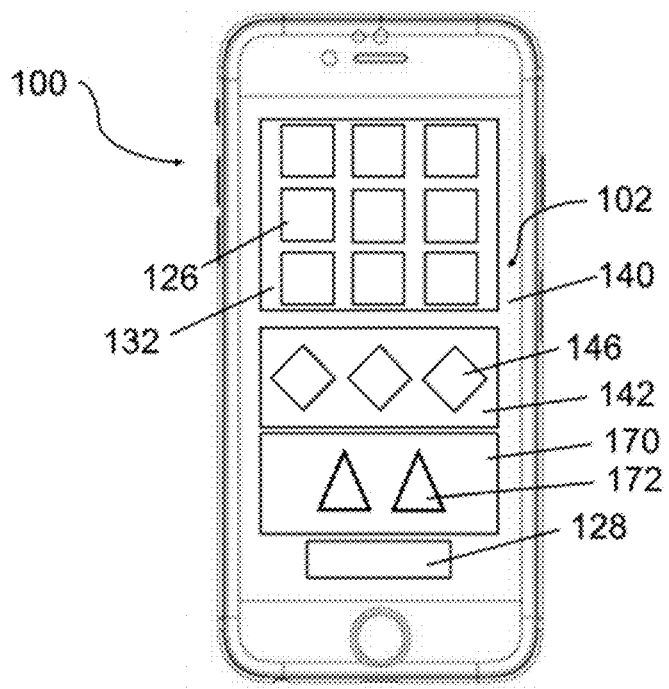
Figure 5F:
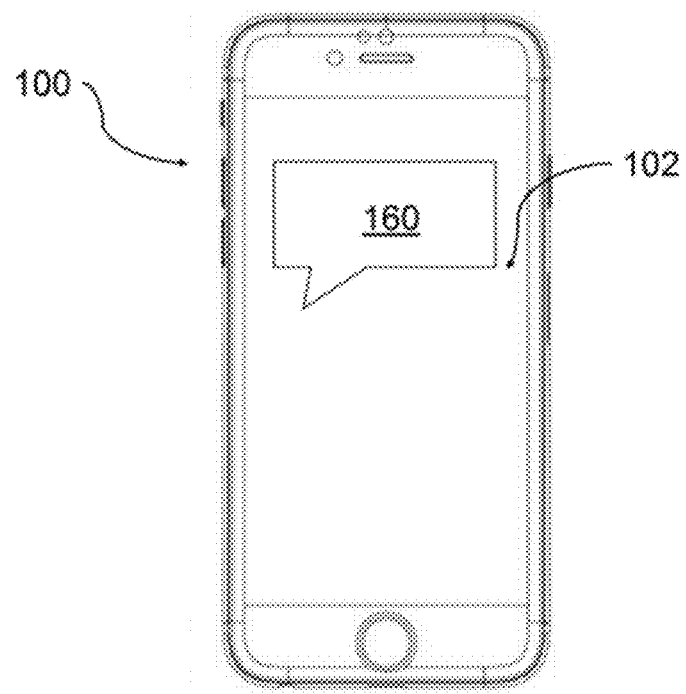

FIG. 5E illustrates a mobile device 100 having a user interface 102 displaying a transmit menu 140. The transmit menu 140 includes an audio file library 132, which includes audio files 126, a target menu 142, which includes target vehicle icons 146, a medium menu 170, which includes medium icons 172, and a confirmation button 128.

FIG. SF illustrates a mobile device 100 having a user interface 102 displaying a message 160.

Figure 6:
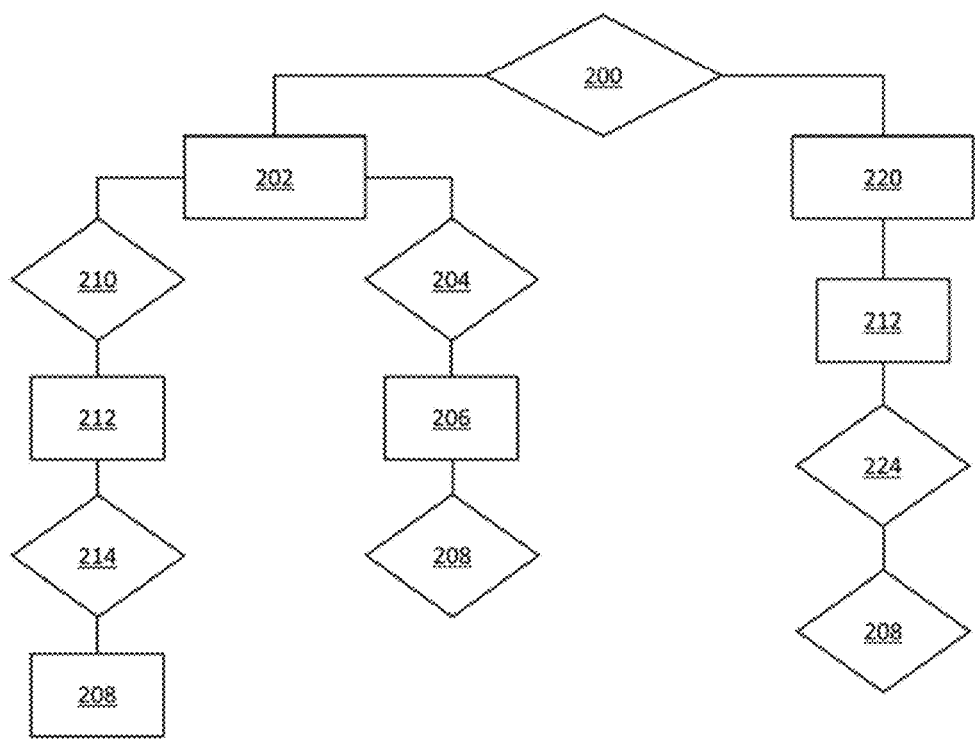
FIG. 6 illustrates a schematic view of the operation of the software application.

FIG. 6 illustrates a schematic of the operation of the software application 104. A passenger (not shown) performs the step of accessing the main menu 200. The passenger (not shown) then either performs the step of selecting the purchase/assign menu button 202 or the step of accessing the transmit menu 220.

If the passenger (not shown) performs the step of selecting the purchase/assign menu button 202, then the passenger either performs the step of selecting the purchase function 204 or the step of selecting the assign function 210. If the passenger (not shown) performs the step of selecting the purchase function 204, then the passenger, in chronological sequence, performs the step of selecting an audio file 206 and the step of confirming the selection. If the passenger (not shown) performs the step of selecting the assign function 210, then the passenger, in chronological sequence, performs the step of selecting an audio file 212, the step of selecting a location 214, and the step of confirming selection 208.

If the passenger (not shown) performs the step of selecting the transmit menu 220, then the passenger, in sequence, performs the step of selecting an audio file 212, the step of selecting a recipient 224, and the step of confirming the selection 208.

FIG. 7A illustrates an intersection 280 including a transmitting vehicle 148 and a target vehicle 144. The transmitting vehicle 148 sends an audible signal 150 to the target vehicle 144. For instance, the audible signal 150 may transmit a sound (not shown), more specifically an emotional sound (not shown) such as a "sigh", to the target vehicle 144.

FIG. 7B illustrates an intersection 280 including a transmitting vehicle 148 and a target vehicle 144. The transmitting vehicle 148 sends a wireless signal 152 to the target vehicle 144. For instance, the wireless signal 152 may transmit a sound 158, more specifically an expressional sound (not shown) such as a "thank you", to the target vehicle 144.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or consist of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teaching should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

2 Vehicle
4 Passenger

6 Steering wheel
8 Selector-integrated steering wheel
10 OEM horn
12 Speaker
14 Airbag cover
16 Attaching member
20 Selector device
22 Plurality of buttons
24 First button
26 Second button
28 Third button
30 Fourth button
32 Fifth button
34 Sixth button
36 Send button
38 Unique code
100 Mobile device
100A Transmitting mobile device
100B Receiving mobile device
102 User interface
104 Software application
106 User
107 Antenna
110 Main menu
112 Purchase/assign menu button
114 Share menu button
120 Purchase/assign menu
122 Purchase menu button
123 Purchase menu
124 Audio file catalog
126 Audio file
128 Confirmation button
130 Assign menu button
131 Assign menu
132 Audio file library
134 Assignment map
136 Docks
140 Transmit menu
142 Target menu
144 Target vehicle
146 Target vehicle icon
148 Transmitting vehicle
150 Audible signal
152 Wireless signal
154 Expressional sound
156 Emotional sound
158 Sound
160 Message
170 Medium menu
172 Medium icons
200 Step of accessing the main menu
202 Step of selecting the purchase/assign menu button
204 Step of selecting the purchase function
205 Step of navigating the audio file catalog
206 Step of selecting an audio file
208 Step of confirming selection
210 Step of selecting the assign function
212 Step of selecting an audio file
214 Step of selecting a location
216 Step of selecting a plurality of icons
218 Step of activating a send button
220 Step of accessing the transmit menu
224 Step of selecting a target
225 Step of selecting a medium icon
250 Step of selecting the share menu button
252 Step of selecting the audio file
280 Intersection

I claim:

1. A mobile device for communicating between a first vehicle and a target vehicle in close proximity to each other, the mobile device is located in the first vehicle, the mobile device comprising:
    an antenna for transmitting a wireless signal comprising an audio file to a receiving mobile device,
    a processor and a memory configured to perform steps including:
    running a software application for converting the audio file into an audible signal, a message, or both;
        enabling direct communication between the first vehicle and the target vehicle in lieu of an OEM horn; and
    directing the mobile device to transmit via the antenna the wireless signal to the receiving mobile device running the software application in the target vehicle;
    wherein the audio file is an expressional sound, an emotional sound, or both.

2. The mobile device of claim 1, wherein the expressional sound is "thank you", "you're welcome", "try better next time", "please", or "go ahead".

3. The mobile device of claim 1, wherein the emotional sound is a sigh, a groan, or a hum.

4. The mobile device of claim 1, wherein the mobile device communicates with a selector device, discrete from the mobile device, wherein the selector device has a plurality of buttons and a send button; wherein the selector device directs the audio file to be sent by the wireless signal.

5. The mobile device of claim 4, wherein one of the plurality of buttons are assigned the audio file and upon pressing the one of the plurality of buttons, the audio file is selected.

6. The mobile device of claim 1, wherein the mobile device communicates with a speaker discrete from the mobile device.

7. The mobile device of claim 6, wherein the speaker is installed adjacent the OEM horn.

8. The mobile device of claim 6, wherein the mobile device communicates with the speaker via a wireless signal, a wired signal, or both.

9. The mobile device of claim 1, wherein the first vehicle and the target vehicle are simultaneously present at a same intersection, located in adjacent lanes, or both.

10. The mobile device of claim 1, wherein the mobile device is a mobile phone.

11. A method for communicating between a first vehicle and a target vehicle in close proximity to each other, the method comprising steps of:
    selecting an audio file on a mobile device, the mobile device comprising a processor and a memory, the mobile device located in the first vehicle,
    converting the audio file into an audible signal, a message, or both via a software application that runs on the processor and the memory,
    selecting the target vehicle,
    enabling direct communication between the first vehicle and the target vehicle in lieu of an OEM horn; and
    transmitting the audio file, via an antenna of the mobile device, to another mobile device located in the target vehicle;
    wherein the audio file is an expressional sound, an emotional sound, or both.

12. The method of claim 11, further comprising selecting a medium icon after the step of selecting the target vehicle.

13. The method of claim 11, wherein a step of selecting one of a plurality of buttons on a selector device is performed instead of the step of selecting the audio file.

14. The method of claim 13, further comprising activating a send button on the selector device after the step of selecting the one of the plurality of buttons.

15. The method of claim 13, further comprising assigning the audio file to the one of the plurality of buttons before the step of selecting the one of the plurality of buttons on the selector device.

16. The method of claim 15, wherein the step of assigning the audio file to the one of the plurality of buttons comprises the steps of:
   selecting the audio file,
   selecting a location, which corresponds to the one of the plurality of buttons.

17. The method of claim 16, further comprising inputting a unique code, which is associated with the selector device, into the mobile device before the step of selecting the audio file.

18. The method of claim 11, wherein instead of the step of selecting the target vehicle, the target vehicle is automatically selected based upon the proximity of the mobile device to the target vehicle.

\* \* \* \* \*